United States Patent
Minami

(10) Patent No.: US 11,979,052 B2
(45) Date of Patent: May 7, 2024

(54) POWER SOURCE DEVICE

(71) Applicant: DENSO TEN Limited, Kobe (JP)

(72) Inventor: Tomoyuki Minami, Kobe (JP)

(73) Assignee: DENSO TEN Limited, Kobe (JP)

( * ) Notice: Subject to any disclaimer, the term of this patent is extended or adjusted under 35 U.S.C. 154(b) by 121 days.

(21) Appl. No.: 17/434,564

(22) PCT Filed: Sep. 8, 2020

(86) PCT No.: PCT/JP2020/034012
§ 371 (c)(1),
(2) Date: Aug. 27, 2021

(87) PCT Pub. No.: WO2022/054145
PCT Pub. Date: Mar. 17, 2022

(65) Prior Publication Data
US 2022/0320858 A1   Oct. 6, 2022

(51) Int. Cl.
*H02J 7/34*  (2006.01)
*H02J 1/10*  (2006.01)
*B60R 16/03* (2006.01)
*H02M 3/156* (2006.01)

(52) U.S. Cl.
CPC .............. *H02J 7/345* (2013.01); *H02J 1/108* (2013.01); *B60R 16/03* (2013.01); *H02J 1/106* (2020.01); *H02M 3/156* (2013.01)

(58) Field of Classification Search
CPC ........... H02J 1/08–086; H02J 1/10–109; H02J 7/345; H02J 9/061; H02J 2310/46–48; B60R 16/03–033; H02M 1/008; H02M 1/009; H02M 1/0096; H02M 3/156–157; G06F 1/30–305
See application file for complete search history.

(56) References Cited

U.S. PATENT DOCUMENTS 7,061,212 B2*  6/2006  Phadke .................. H02M 3/28
                                            323/224
2010/0219684 A1*  9/2010  Iino .......................... H02J 9/061
                                            307/23

(Continued)

FOREIGN PATENT DOCUMENTS

EP     1515412 A1    3/2005
JP   S57-208825 A   12/1982

(Continued)

OTHER PUBLICATIONS

"How to read schematics", Jan. 31, 2001, retrieved at <http://doctord.dyndns.org/courses/topics/electronics/Mark_Sokos/How_to_read_schematics.htm> (Year: 2001).*

*Primary Examiner* — Rexford N Barnie
*Assistant Examiner* — David A Shiao
(74) *Attorney, Agent, or Firm* — Oliff PLC

(57) ABSTRACT

A power source device includes a step-up circuit, a diode for backflow prevention, and an electrolytic capacitor. The step-up circuit is connected to a power source on an input side thereof and is connected to a first load and a second load in parallel on an output side thereof. The diode for backflow prevention is connected between the step-up circuit and the first load. The electrolytic capacitor is connected between the diode for backflow prevention and the first load.

4 Claims, 2 Drawing Sheets

(56) References Cited

U.S. PATENT DOCUMENTS

| | | | | |
|---|---|---|---|---|
| 2011/0231042 | A1* | 9/2011 | Ueda | B60L 3/0084 |
| | | | | 903/902 |
| 2016/0336856 | A1* | 11/2016 | Jin | H02M 3/158 |
| 2016/0347184 | A1* | 12/2016 | Kikuchi | B60R 16/03 |
| 2018/0029545 | A1* | 2/2018 | Mohrmann | B60R 16/033 |
| 2018/0086419 | A1* | 3/2018 | Crain | B60W 10/06 |
| 2018/0095442 | A1* | 4/2018 | Ueda | G06F 11/14 |
| 2019/0334375 | A1* | 10/2019 | Wataru | H02J 1/12 |
| 2021/0152015 | A1* | 5/2021 | Naraoka | H02J 7/0029 |

FOREIGN PATENT DOCUMENTS

| | | | |
|---|---|---|---|
| JP | S63-206129 | A | 8/1988 |
| JP | H07-271458 | A | 10/1995 |
| JP | WO2002099947 | A1 * | 9/2004 |
| JP | 2005-335470 | A | 12/2005 |
| JP | 2008-101590 | A | 5/2008 |
| JP | 2010-206875 | A | 9/2010 |
| JP | 2019-193517 | A | 10/2019 |
| JP | 2020-068541 | A | 4/2020 |
| WO | 2016/111340 | A1 | 7/2016 |

\* cited by examiner

POWER SOURCE DEVICE

CROSS-REFERENCE TO RELATED APPLICATION(S)

This application is a national stage application of International Application No. PCT/JP2020/034012, filed on Sep. 8, 2020, which designates the United States, the entire contents of which are herein incorporated by reference.

FIELD

The present invention relates to a power source device.

BACKGROUND

A technique has conventionally known that arranges a step-up circuit in order to maintain a constant input voltage of a load even at a time of so-called cold cranking where a battery voltage is temporarily dropped at a time when an atmospheric temperature is low, such as during a winter season. For an example of such a technique, a step-up circuit may be arranged for each load (see, for example, Patent Literature 1).

CITATION LIST

Patent Literature

Patent Literature 1: Japanese Patent Application Publication No. 2008-101590

SUMMARY

Technical Problem

However, in a conventional technique, as a number of a load(s) is increased, a number of a step-up circuit(s) is also increased, so that a circuit size may be increased. Furthermore, for example, in a case of a load that temporarily holds information for being written in a storage medium in a memory, a step-up circuit in a conventional technique may fail to function so as to cut power supply in a case where a power source is instantaneously interrupted.

The present invention is provided by taking the above into consideration and aims to provide a power source device that is capable of restraining a circuit size and supplying power stably even when a battery voltage is dropped.

Solution to Problem

In order to solve a problem(s) as described above and achieve an object, a power source device according to the present invention includes a step-up circuit, a diode for backflow prevention, and an electrolytic capacitor. The step-up circuit is connected to a power source on an input side thereof and is connected to a first load and a second load in parallel on an output side thereof. The diode for backflow prevention is connected between the step-up circuit and the first load. The electrolytic capacitor is connected between the diode for backflow prevention and the first load.

Advantageous Effects of Invention

According to the present invention, it is possible to restrain a circuit size and supply power stably even when a battery voltage is dropped.

DESCRIPTION OF EMBODIMENTS

Hereinafter, an embodiment(s) of a power source device as disclosed in the present application will be explained in detail, with reference to the accompanying drawing(s). Additionally, the present invention is not limited by an embodiment(s) as illustrated below.

Furthermore, hereinafter, a power source device according to a first embodiment will be explained by using FIG. 1 and a power source device according to a second embodiment will be explained by using FIG. 2.

First, a power source device according to a first embodiment will be explained by using FIG. 1. FIG. 1 is a diagram that illustrates a configuration example of a power source system that includes a power source device according to an embodiment. For example, a power source system S as illustrated in FIG. 1 is mounted on a vehicle and supplies power to each load of the vehicle.

Figure 1:
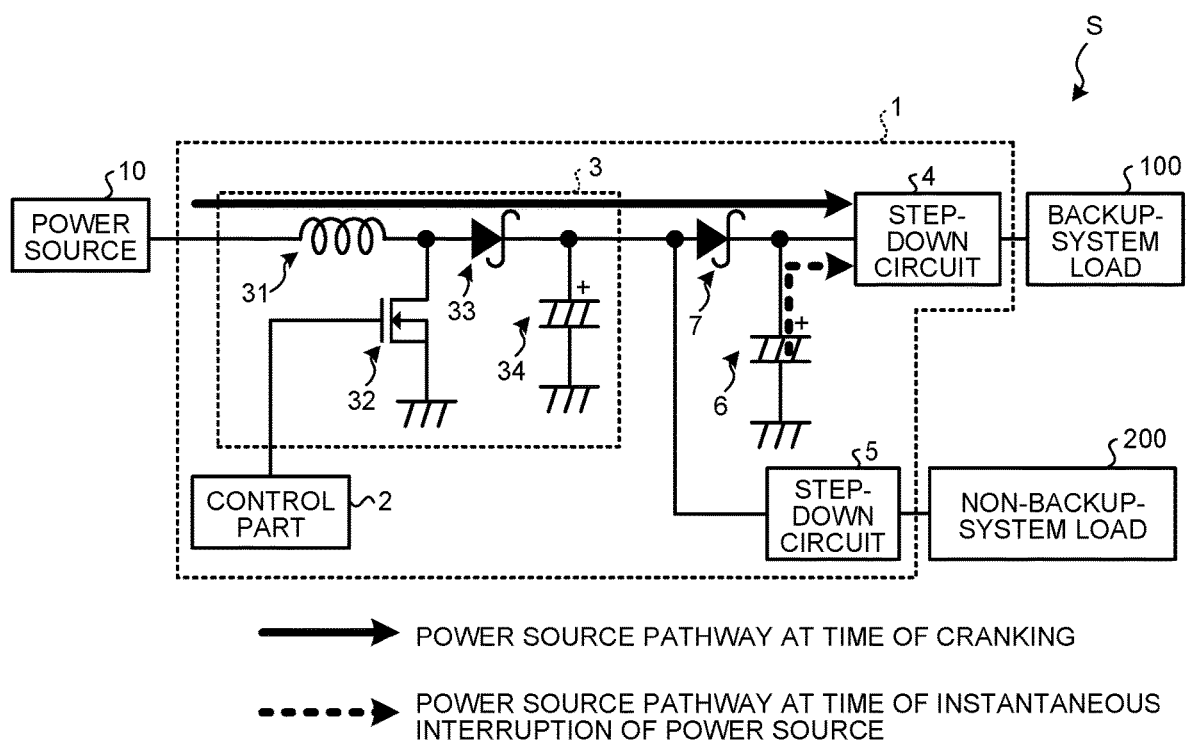
FIG. 1 is a diagram that illustrates a configuration example of a power source system that includes a power source device according to a first embodiment.

As illustrated in FIG. 1, the power source system S according to a first embodiment includes a power source device 1, a power source 10, a backup-system load 100 (an example of a first load), and a non-backup-system load 200 (an example of a second load).

The power source 10 is, for example, a lead battery. The power source 10 is connected to an input side of the power source device 1 and supplies power to the power source device 1.

The backup-system load 100 is a load that needs memory holding. For example, the backup-system load 100 is a microcomputer that executes a variety of vehicle control or a microcomputer such as a navigation device and is a load that temporarily holds information for being written in a non-illustrated storage medium in a memory.

The non-backup-system load 200 is a load that does not need memory holding. For example, the non-backup-system load 200 is an on-vehicle camera, a lighting instrument (an interior light or a headlight) of a vehicle, or the like.

The backup-system load 100 and the non-backup-system load 200 are connected to the power source device 1 in parallel.

Additionally, although FIG. 1 illustrates a case where the backup-system load 100 and the non-backup-system load 200 are respectively provided one by one, a plurality thereof may be provided respectively. In such a case, a plurality of backup-system loads 100 and a plurality of non-backup-system loads 200 are respectively connected to the power source device 1 in parallel.

The power source device 1 according to an embodiment includes a control part 2, a step-up circuit 3, step-down circuits 4, 5, an electrolytic capacitor 6, and a diode 7 (a diode for backflow prevention).

The control part 2 is connected to a gate of a switch element 32 of the step-up circuit 3 as described later and supplies a voltage to such a gate so as to control on and off of the switch element 32.

The step-up circuit 3 steps up a voltage that is supplied from the power source 10 by control of the control part 2. The step-up circuit 3 is connected to the power source 10 on an input side thereof and is connected to the backup-system load 100 and the non-backup-system load 200 in parallel through the step-down circuits 4, 5 on an output side thereof. As illustrated in FIG. 1, the step-up circuit 3 includes a coil 31, a switch element 32, a diode 33, and an electrolytic capacitor 34.

The coil 31 is connected to the power source 10 on a primary side thereof and is connected to the switch element 32 and an anode of the diode 33 on a secondary side thereof.

The switch element 32 is, for example, a transistor such as a MOSFET (Metal-Oxide-Semiconductor Field-Effect Transistor). The switch element 32 is provided with a gate that is connected to the control part 2, a drain that is connected between the coil 31 and the diode 33, and a source that is grounded.

The diode 33 is provided for backflow prevention and is provided with an anode that is connected to the coil 31 and a drain of the switch element 32 as described above and a cathode that is connected to the electrolytic capacitor 34, an anode of the diode 7, and a step-down circuit 5. The electrolytic capacitor 34 is connected between the diode 33 and the diode 7.

The diode 7 is provided for backflow prevention and is provided with an anode that is connected to the diode 33 and the electrolytic capacitor 34 of the step-up circuit 3 as described above and a cathode that is connected to a step-down circuit 4 and the electrolytic capacitor 6. The electrolytic capacitor 6 is connected between the diode 7 and the step-down circuit 4.

The step-down circuit 4 is a step-down-type DCDC converter, is connected to a cathode of the diode 7 and the electrolytic capacitor 6 on an input side thereof, and is connected to the backup-system load 100 on an output side thereof. The step-down circuit 4 steps down a direct current voltage that is output from the step-up circuit 3 and applies it to the backup-system load 100. Additionally, the step-down circuit 4 is a first step-down circuit.

The step-down circuit 5 is a step-down-type DCDC converter, is connected between the diode 7 and the step-up circuit 3 on an input side thereof, and is connected to the non-backup-system load 200 on an output side thereof. The step-down circuit 5 steps down a direct current voltage that is output from the step-up circuit 3 and applies it to the non-backup-system load 200. Additionally, the step-down circuit 5 is a second step-down circuit.

Herein, a step-up circuit is conventionally provided for each load. As FIG. 1 is provided as an example, a dedicated step-up circuit is provided for each of the backup-system load 100 and the non-backup-system load 200. Hence, as a number of a load(s) is increased, a number of a step-up circuit(s) is also increased, so that a circuit size may be increased.

Accordingly, in the power source device 1 according to an embodiment, a plurality of loads (the backup-system load 100 and the non-backup-system load 200) are connected to one step-up circuit 3 in parallel. That is, in the power source device 1 according to an embodiment, one step-up circuit 3 is shared by a plurality of loads.

Moreover, in the power source device 1 according to an embodiment, the electrolytic capacitor 6 is connected to the step-down circuit 4 that is connected to the backup-system load 100. Thereby, at a time of instantaneous interruption of the power source 10, power that is stored on the electrolytic capacitor 6 is supplied to the backup-system load 100 through the step-down circuit 4.

Herein, an operation of the power source system S according to a first embodiment will be explained by using FIG. 1.

First, in a normal state (other than cranking and instantaneous interruption), a voltage that is provided by transforming power that is supplied from the power source 10 through the step-up circuit 3 and the step-down circuit 4 is applied to the backup-system load 100, and simultaneously, a voltage that is provided by transforming power that is supplied from the power source 10 through the step-up circuit 3 and the step-down circuit 5 is applied to the non-backup-system load 200.

Thereby, a current that is supplied from the power source 10 flows to the backup-system load 100 and the non-backup-system load 200. Furthermore, therein, the electrolytic capacitor 6 is charged. Additionally, in a normal state, the step-up circuit 3 is not operated, and in a case where, for example, a voltage on an output side thereof falls below a predetermined value by cranking of the power source 10, a PWM (Pulse Width Modulation) signal that is a control signal of the control part 2 is applied to a gate thereof so as to switch the switch element 32 and step up the voltage on an output side thereof to the predetermined value or higher.

Furthermore, as illustrated in FIG. 1, at a time of cranking, a voltage that is provided by transforming power that is supplied from the power source 10 through the step-up circuit 3 and the step-down circuit 4 is applied to the backup-system load 100, and simultaneously, a voltage that is provided by transforming power that is supplied from the power source 10 through the step-up circuit 3 and the step-down circuit 5 is applied to the non-backup-system load 200. That is, in the power source system S according to a first embodiment, an identical power source pathway is provided in a normal state and at a time of cranking.

Moreover, at a time of cranking, the step-up circuit 3 steps up an output voltage to a voltage value that is needed as an input voltage of the step-down circuit 4 and the step-down circuit 5, according to control of the control part 2. Thereby, even if a voltage of the power source 10 is temporarily dropped by cranking, stepping up thereof is executed by the step-up circuit 3, so that it is possible to satisfy an input voltage that is needed by the step-down circuit 4 and the step-down circuit 5 and hence it is possible to supply power to each load.

Furthermore, as illustrated in FIG. 1, at a time of instantaneous interruption of the power source 10, power that is charged on the electrolytic capacitor 6 is supplied to the backup-system load 100 through the step-down circuit 4. Herein, the diode 7 functions as a backflow prevention valve, so that it is possible to prevent power of the electrolytic capacitor 6 from flowing to the non-backup-system load 200. That is, even at a time of instantaneous interruption of the power source 10, power is supplied from the electrolytic capacitor 6, so that it is possible to operate the backup-system load 100, and hence, even in a case where a whole system is stopped by the instantaneous interruption, it is possible to write information that is held by a memory in a storage medium.

Additionally, even if power supply is cut by instantaneous interruption, an operation of the non-backup-system load 200 is merely stopped where an error such as a loss of memory information like the backup-system load 100 is not caused.

Thus, in the power source device 1 according to a first embodiment, the step-up circuit 3 is shared by a plurality of loads, so that it is possible to decrease a circuit size as compared with a case where a step-up circuit is conventionally arranged for each of a plurality of loads. Furthermore, the electrolytic capacitor 6 is arranged, so that it is possible to supply power from the electrolytic capacitor 6 to the backup-system load 100 stably even at a time of instantaneous interruption of the power source 10.

That is, in the power source device 1 according to a first embodiment, it is possible to restrain a circuit size and supply power to a load stably even when a voltage of the power source 10 is dropped (at a time of cranking and a time of instantaneous interruption).

As has been described above, a power source device 1 according to a first embodiment includes a step-up circuit 3, a diode for backflow prevention (a diode 7), and an electrolytic capacitor 6. The step-up circuit 3 is connected to a power source 10 on an input side thereof and is connected to a first load (a backup-system load 100) and a second load (a non-backup-system load 200) in parallel on an output side thereof. The diode 7 (a diode for backflow prevention) is connected between the step-up circuit 3 and the first load. The electrolytic capacitor 6 is connected between the diode for backflow prevention (the diode 7) and the first load. Thereby, it is possible to restrain a circuit size and supply power stably even when a voltage of a power source 10 is dropped.

Next, a power source device 1 according to a second embodiment will be explained by using FIG. 2. FIG. 2 is a diagram that illustrates a configuration example of a power source system S that includes a power source device 1 according to a second embodiment.

Figure 2:
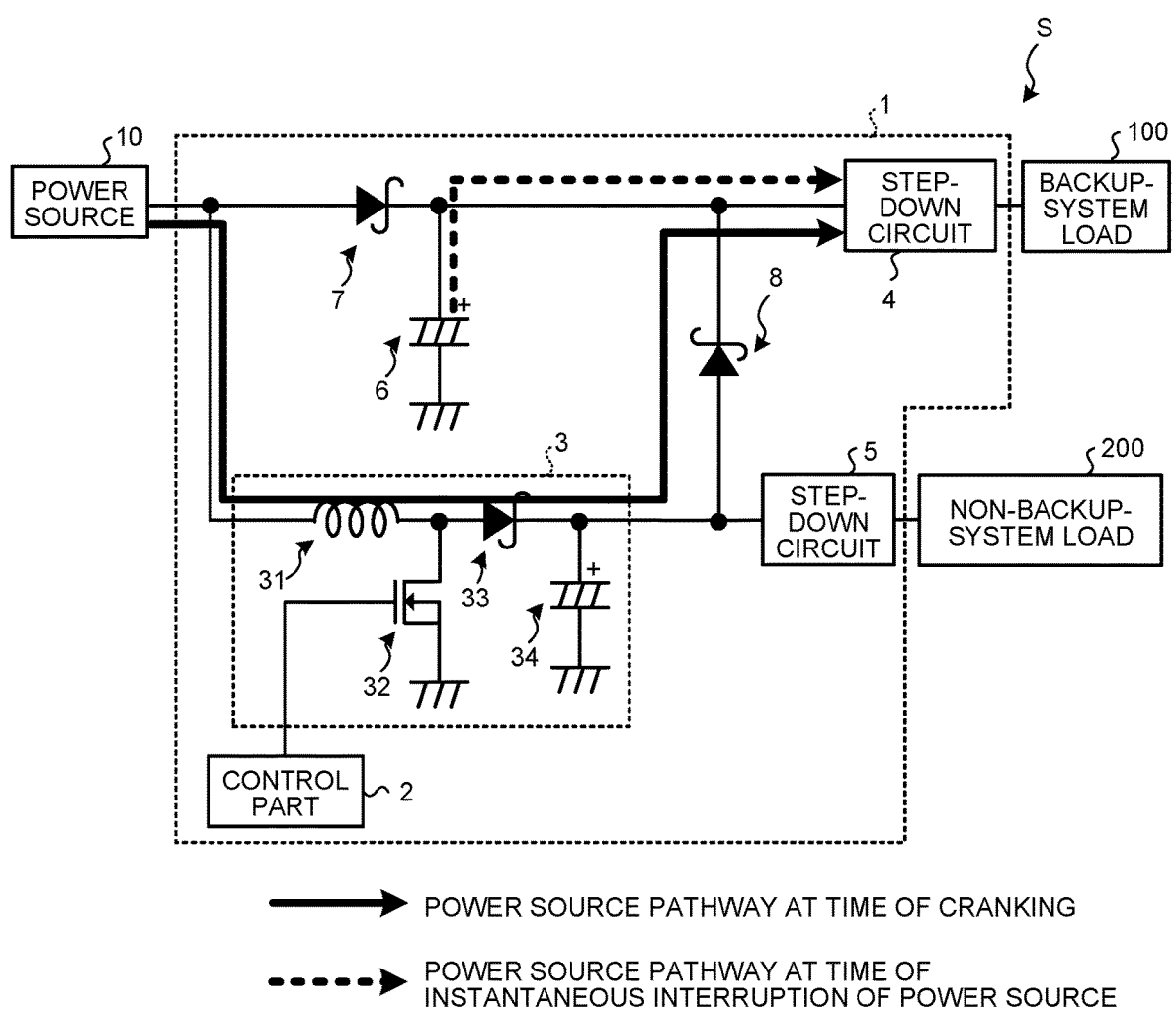
FIG. 2 is a diagram that illustrates a configuration example of a power source system that includes a power source device according to a second embodiment.

As illustrated in FIG. 2, the power source system S according to a second embodiment includes a power source device 1, a power source 10, a backup-system load 100, and a non-backup-system load 200. In a second embodiment, the power source device 1 is connected to the power source 10 on an input side thereof and is connected to the backup-system load 100 and the non-backup-system load 200 in parallel on an output side thereof, similarly to a first embodiment.

The power source device 1 includes a control part 2, a step-up circuit 3, step-down circuits 4, 5, an electrolytic capacitor 6, a diode 7 (an example of a second diode for backflow prevention), and a diode 8 (an example of a first diode for backflow prevention).

The power source device 1 according to a second embodiment is different from the power source device 1 according to a first embodiment in that the diode 8 is further included and that arrangement of each circuit is different therefrom, so that such a different point(s) will be focused and explained.

Specifically, the step-up circuit 3 is connected to the power source 10 on an input side thereof and is connected to a plurality of loads in parallel on an output side thereof. More specifically, the step-up circuit 3 is connected to a step-down circuit 4 and a step-down circuit 5 in parallel through the diode 8 on an output side thereof.

The diode 8 is provided for backflow prevention and is provided with an anode that is connected between the step-up circuit 3 and the step-down circuit 5 and a cathode that is connected among the step-down circuit 4, the diode 7, and the electrolytic capacitor 6.

The diode 7 is provided with an anode that is connected between the power source 10 and an input side of the step-up circuit 3 and a cathode that is connected among the electrolytic capacitor 6, the diode 8, and the step-down circuit 4. That is, the diode 7 is connected to the power source 10 in parallel to the step-up circuit 3. The electrolytic capacitor 6 is provided with one end that is connected among the diode 7, the diode 8, and the step-down circuit 4 and another end that is grounded.

Herein, an operation of the power source system S according to a second embodiment will be explained by using FIG. 2. First, in a normal state, a voltage that is provided by transforming power that is supplied from the power source 10 through the step-up circuit 3 and the step-down circuit 4 is applied to the backup-system load 100, and simultaneously, a voltage that is provided by transforming power that is supplied from the power source 10 through the step-up circuit 3 and the step-down circuit 5 is applied to the non-backup-system load 200.

Thereby, a current that is supplied from the power source 10 flows to the backup-system load 100 and the non-backup-system load 200. Furthermore, herein, power of the power source 10 flows to the electrolytic capacitor 6 through the diode 7, so that the electrolytic capacitor 6 is charged. Additionally, in a normal state, the step-up circuit 3 is not operated, and in a case where, for example, a voltage on an output side thereof falls below a predetermined value by cranking of the power source 10, a PWM (Pulse Width Modulation) signal that is a control signal of the control part 2 is applied to a gate thereof so as to switch a switch element 32 and step up the voltage on an output side thereof to the predetermined value or higher.

Furthermore, as illustrated in FIG. 2, at a time of cranking, a voltage that is provided by transforming power that is supplied from the power source 10 through the step-up circuit 3 and the step-down circuit 4 is applied to the backup-system load 100, and simultaneously, a voltage that is provided by transforming power that is supplied from the power source 10 through the step-up circuit 3 and the step-down circuit 5 is applied to the non-backup-system load 200. That is, in the power source system S according to a second embodiment, an identical power source pathway is provided in a normal state and at a time of cranking.

Moreover, at a time of cranking, the step-up circuit 3 steps up an output voltage to a voltage value that is needed as an input voltage of the step-down circuit 4 and the step-down circuit 5, according to control of the control part 2. Thereby, even if a voltage of the power source 10 is temporarily dropped by cranking, stepping up thereof is executed by the step-up circuit 3, so that it is possible to satisfy an input voltage that is needed by the step-down circuit 4 and the step-down circuit 5 and hence it is possible to supply power to each load.

Furthermore, as illustrated in FIG. 2, at a time of instantaneous interruption of the power source 10, power that is charged on the electrolytic capacitor 6 is supplied to the backup-system load 100 through the step-down circuit 4. Herein, the diode 8 functions as a backflow prevention valve, so that it is possible to prevent power of the electrolytic capacitor 6 from flowing to the non-backup-system load 200. That is, even at a time of instantaneous interruption of the power source 10, power is supplied from the electrolytic capacitor 6, so that it is possible to operate the backup-system load 100, and hence, even in a case where a whole system is stopped by the instantaneous interruption, it is possible to write information that is held by a memory in a storage medium.

Additionally, even if power supply is cut by instantaneous interruption, an operation of the non-backup-system load 200 is merely stopped where an error such as a loss of memory information like the backup-system load 100 is not caused.

Thus, in the power source device 1 according to a second embodiment, the step-up circuit 3 is shared by a plurality of loads, so that it is possible to decrease a circuit size as compared with a case a step-up circuit is conventionally arranged for each of a plurality of loads. Furthermore, the electrolytic capacitor 6 is arranged, so that it is possible to supply power from the electrolytic capacitor 6 to the backup-system load 100 stably even at a time of instantaneous interruption of the power source 10.

Moreover, a dark current to the backup-system load 100 at a time of a stop of the power source 10 in the power source device 1 according to a second embodiment is less than that in the power source device 1 according to a first embodiment. Specifically, in the power source device 1 according to a first embodiment, two diodes (a diode 33 and a diode 7) are present on a route from the power source 10 to the backup-system load 100. On the other hand, in the power source device 1 according to a second embodiment, only one diode 7 is present on such a route (a route of the diode 7→the step-down circuit 4→the backup-system load 100).

Hence, a voltage drop that is caused by a diode in the power source device 1 according to a second embodiment is less than that in the power source device 1 according to a first embodiment, so that it is possible to restrain a dark current that flows to the backup-system load 100. Thereby, it is possible to restrain running out of a battery.

As has been described above, a power source device 1 according to a second embodiment includes a step-up circuit 3, a first diode for backflow prevention (a diode 8), a second diode for backflow prevention (a diode 7), and an electrolytic capacitor 6. The step-up circuit 3 is connected to a power source 10 on an input side thereof and is connected to a first load (a backup-system load 100) and a second load (a non-backup-system load 200) in parallel on an output side thereof. The first diode for backflow prevention (the diode 8) is connected between the step-up circuit 3 and the first load. The second diode for backflow prevention (the diode 7) is connected between the power source 10 and the first load and is connected to the power source 10 in parallel to the step-up circuit 3. The electrolytic capacitor 6 is connected between the second diode for backflow prevention (the diode 7) and the first load. Thereby, it is possible to restrain a circuit size and supply power stably even when a voltage of a power source 10 is dropped. Moreover, in a power source device 1 according to a second embodiment, it is possible to restrain a dark current at a time of a stop of a power source 10.

It is possible for a person(s) skilled in the art to readily derive an additional effect(s) and/or variation(s). Hence, a broader aspect(s) of the present invention is/are not limited to a specific detail(s) and a representative embodiment(s) as illustrated and described above. Therefore, various modifications are possible without departing from the spirit or scope of a general inventive concept that is defined by the appended claim(s) and an equivalent(s) thereof.

REFERENCE SIGNS LIST 1 power source device
2 control part
3 step-up circuit
4, 5 step down circuit
6, 34 electrolytic capacitor
7, 8, 33 diode
10 power source
31 coil
32 switch element
100 backup-system load
200 non-backup-system load
S power source system

The invention claimed is:

1. A power source device, comprising:
a step-up circuit with an input side that is connected to a power source and an output side that is connected to a first load and a second load in parallel,
wherein the step-up circuit is activated to boost a voltage on the output side when the voltage on the output side is lower than a predetermined value;
a first diode for backflow prevention that is connected between the step-up circuit and the first load;
a second diode for backflow prevention that is connected between the power source and the first load and is connected to the power source in parallel to the step-up circuit; and
an electrolytic capacitor that is connected between the second diode for backflow prevention and the first load,
wherein the power source is directly connected to the electrolytic capacitor by the second diode.

2. The power source device according to claim 1, further comprising:
a first step-down circuit that is connected between the electrolytic capacitor and the first load; and
a second step-down circuit that is connected between the step-up circuit and the second load.

3. The power source device according to claim 1, wherein the step-up circuit is connected to a plurality of first loads, including the first load, in parallel.

4. The power source device according to claim 1, wherein the step-up circuit is connected to a plurality of second loads, including the second load, in parallel.

* * * * *